United States Patent
Yang

(10) Patent No.: US 9,870,510 B2
(45) Date of Patent: Jan. 16, 2018

(54) APPARATUS AND METHOD FOR COUNTING MOVING OBJECTS

(71) Applicant: FUJITSU LIMITED, Kawasaki-shi, Kanagawa (JP)

(72) Inventor: Yawen Yang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 15/212,876

(22) Filed: Jul. 18, 2016

(65) Prior Publication Data
US 2017/0032193 A1    Feb. 2, 2017

(30) Foreign Application Priority Data

Jul. 31, 2015 (CN) .......................... 2015 1 0463048

(51) Int. Cl.
*G06K 9/00* (2006.01)
*G06T 7/20* (2017.01)

(52) U.S. Cl.
CPC ............ *G06K 9/00771* (2013.01); *G06T 7/20* (2013.01); *G06T 2207/30236* (2013.01); *G06T 2207/30242* (2013.01)

(58) Field of Classification Search
None
See application file for complete search history.

(56) References Cited

U.S. PATENT DOCUMENTS

2014/0334668 A1* 11/2014 Saund .................. G06T 7/20
382/103

FOREIGN PATENT DOCUMENTS

EP    3156972 A1 *  4/2017

* cited by examiner

*Primary Examiner* — Delomia L Gilliard
(74) *Attorney, Agent, or Firm* — Staas & Halsey LLP

(57) ABSTRACT

An apparatus and method for counting moving objects is disclosed that includes: an establishing unit configured to detect moving objects in each frame of image in a surveillance video, establish a moving object track set according to the detected moving objects, and score a track of the moving object according to the number of times of consecutively detecting a moving object in the moving object track in the moving object track set; a filtering unit configured to remove a moving object track in the moving object track set with a score less than or equal to a predefined threshold value; and a counting unit configured to count moving objects according to the moving object tracks in the moving object track set after the removal. With the apparatus and method, completeness of the established moving object track set may be ensured, and accuracy of the counting may be efficiently improved.

12 Claims, 6 Drawing Sheets

APPARATUS AND METHOD FOR COUNTING MOVING OBJECTS

CROSS-REFERENCE TO RELATED APPLICATIONS

This application claims the priority benefit of Chinese Patent Application No. 201510463048.0, filed on Jul. 31, 2015 in the Chinese State Intellectual Property Office, the disclosure of which is incorporated herein in its entirety by reference.

BACKGROUND

1. Field

The present disclosure relates to the field of information technologies, and in particular to an apparatus and method for counting moving objects.

2. Description of the Related Art

As the complication of the urban transportation states, surveillance and control of the transportation states are increasingly popular, and counting of such moving objects as running cars and pedestrians is one of common functions of the video surveillance. A method for tracking a moving object is important to the counting of the moving objects.

In an existing method for counting moving objects, which part of an image belongs to a moving object is usually determined by using a Gaussian foreground detecting algorithm, and the moving object is tracked by using a targets overlap or particle tracking method.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the invention.

When the existing method is used to count moving objects, it is prone to missing a target object in tracking, which results in inaccuracy of a counting result.

Embodiments of the present disclosure provide an apparatus and method for counting moving objects, in which moving object tracks in a moving object track set are scored according to the number of times of consecutively detecting a moving object, and the moving object tracks in the moving object track set are screened according to the scores of the moving object tracks, thereby ensuring over completeness of the established moving object track set, and efficiently improving accuracy of the counting.

According to a first aspect of embodiments of the present disclosure, there is provided an apparatus for counting moving objects, including: an establishing unit configured to detect a moving object in each frame of image in a surveillance video, establish a moving object track set according to the detected moving object, and score a track of the moving object according to the number of times of consecutively detecting a moving object in the moving object track in the moving object track set; a filtering unit configured to remove a moving object track in the moving object track set with a score less than or equal to a predefined threshold value; and a counting unit configured to count moving objects according to moving objects in the moving object track set after the removal.

According to a second aspect of embodiments of the present disclosure, there is provided a method for counting moving objects, including: detecting a moving object in each frame of image in a surveillance video, establishing a moving object track set according to the detected moving object of the surveillance video, and scoring a track of the moving object according to the number of times of consecutively detecting a moving object in the moving object track in the moving object track set; removing a moving object track in the moving object track set with a score less than or equal to a predefined threshold value; and counting moving objects according to moving object tracks in the moving object track set after the removal.

An advantage of embodiments of the present disclosure exists in that moving object tracks in a moving object track set are scored according to the number of times of consecutively detecting a moving object, and the moving object tracks in the moving object track set are screened according to the scores of the moving object tracks, thereby ensuring over completeness of the established moving object track set, and efficiently improving accuracy of the counting.

With reference to the following description and drawings, the particular embodiments of the present disclosure are disclosed in detail, and the principles of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

Figure 1:
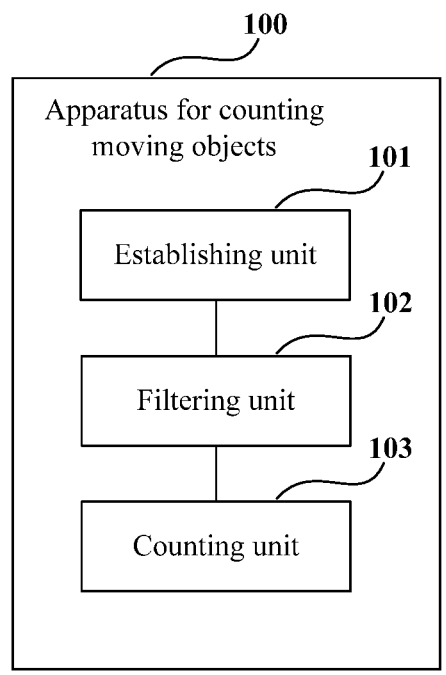
FIG. 1 is a schematic diagram of a structure of the apparatus for counting moving objects of Embodiment 1 of the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

FIG. 1 is a schematic diagram of a structure of the apparatus for counting moving objects of Embodiment 1 of the present disclosure. As shown in FIG. 1, the apparatus 100 includes:

an establishing unit 101 configured to detect a moving object in each frame of image in a surveillance video, establish a moving object track set according to the detected moving object, and score a track of the moving object according to the number of times of consecutively detecting a moving object in the moving object track in the moving object track set;

a filtering unit 102 configured to remove a moving object track in the moving object track set with a score less than or equal to a predefined threshold value; and a counting unit 103 configured to count moving objects according to moving object tracks in the moving object track set after the removal.

It can be seen from the above embodiment that moving object tracks in a moving object track set are scored according to the number of times of consecutively detecting a moving object, and the moving object tracks in the moving object track set are screened according to the scores of the moving object tracks, thereby ensuring over completeness of the established moving object track set, and efficiently improving accuracy of the counting.

In this embodiment, the moving object may be any object in a moving state needing to be counted. For example, the moving object may be a car running on the road, or a pedestrian or a walking animal.

In this embodiment, the surveillance video may be obtained by using an existing method. For example, it may be obtained by a camera mounted over an area needing to be surveilled.

In this embodiment, the number of frames of the surveillance video may be set according to an actual situation. For example, the number of frames of the surveillance video may be set according to a size of a region of interest (ROI) in the surveillance video. For example, the number of frames of the surveillance video is 15-20.

In this embodiment, the establishing unit 101 is configured to detect a moving object in each frame of image in the surveillance video, establish a moving object track set according to the detected moving object, and score a track of the moving object according to the number of times of consecutively detecting a moving object in the moving object track in the moving object track set.

A structure of the establishing unit 101 and a method for establishing a moving object track set and scoring shall be illustrated below.

Figure 2:
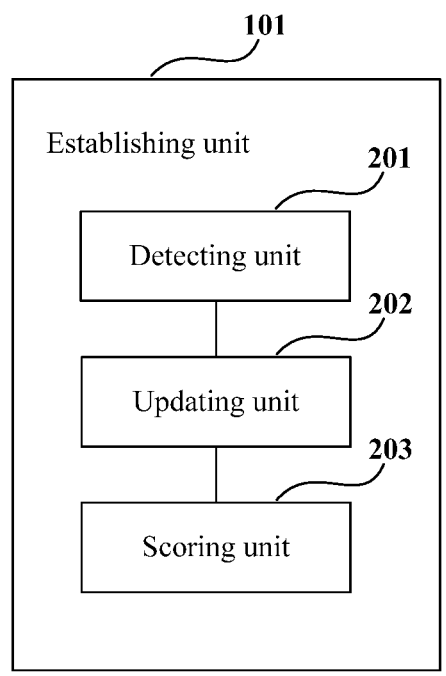
FIG. 2 is a schematic diagram of a structure of an establishing unit 101 of Embodiment 1 of the present disclosure.

FIG. 2 is a schematic diagram of a structure of an establishing unit 101 of Embodiment 1 of the present disclosure. As shown in FIG. 2, the establishing unit 101 includes:

a detecting unit 201 configured to detect a moving object in a predefined area in a current frame;

an updating unit 202 configured to update a moving object track in a preceding frame or establish a moving object track according to a position of the moving object detected in the current frame and a position of a moving object predicted by the moving object track in the preceding frame, to update a moving object track set in the current frame; and a scoring unit 203 configured to determine a score of a moving object track in the current frame according to the number of times of consecutively detecting a moving object in the moving object track in the updated moving object track set in the current frame and before the current frame.

Figure 3:
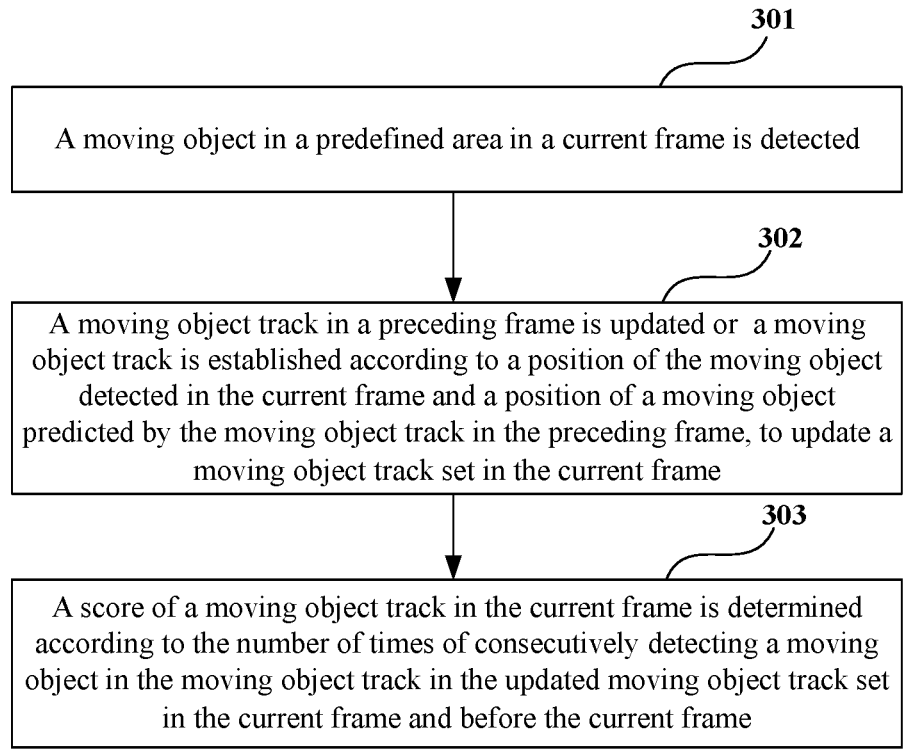
FIG. 3 is a flowchart of a method for establishing a moving track set and scoring of Embodiment 1 of the present disclosure.

FIG. 3 is a flowchart of a method for establishing a moving object track set and scoring of Embodiment 1 of the present disclosure. As shown in FIG. 3, the method includes:

Step 301: a moving object in a predefined area in a current frame is detected;

Step 302: a moving object track in a preceding frame is updated or a moving object track is established according to a position of the moving object detected in the current frame and a position of a moving object predicted by the moving object track in the preceding frame, to update a moving object track set in the current frame; and Step 303: a score of a moving object track in the current frame is determined according to the number of times of consecutively detecting a moving object in the moving object track in the updated moving object track set in the current frame and before the current frame.

In this way, by updating an existing moving object track or establishing a new moving object track according to the position of the detected moving object and the predicted position of the preceding frame, over completeness of the established moving object track set may be ensured further, and accuracy of the counting may be efficiently improved further.

In this embodiment, the detecting unit 201 is configured to detect a moving object in the predefined area in the current frame. In this embodiment, the predefined area may be set according to an actual situation. For example, the predefined area may be a region of interest (ROI).

In this embodiment, the detecting unit 201 may detect a moving object in the predefined area in the current frame by using an existing method. For example, a classifier may be used to perform target detection in the predefined area. For example, the classifier may be obtained by training a positive sample image containing a target object and a negative sample image containing no target object after extracting features of histograms of oriented gradients (HOG).

In this embodiment, after detecting the moving object in the predefined area in the current frame, the updating unit 202 updates a moving object track in a preceding frame or establishes a moving object track according to a position of the detected moving object and a position of a moving object predicted by the moving object track in the preceding frame, to update a moving object track set in the current frame.

A structure of the updating unit 202 and a method for updating the moving object track set in the current frame shall be illustrated below.

Figure 4:
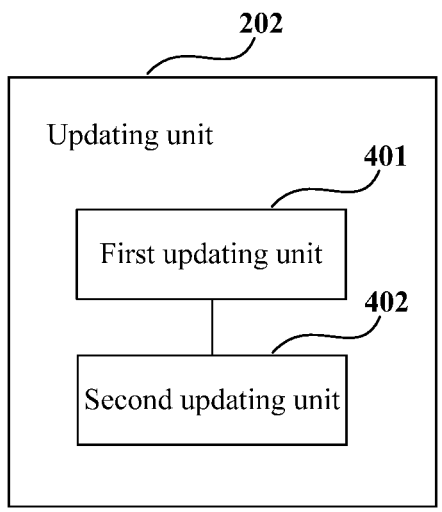
FIG. 4 is a schematic diagram of a structure of an updating unit 202 of Embodiment 1 of the present disclosure.

FIG. 4 is a schematic diagram of a structure of the updating unit 202 of Embodiment 1 of the present disclosure. As shown in FIG. 4, the updating unit 202 includes:

- a first updating unit 401 configured to, when the position of the moving object detected in the current frame is matched with the position of the moving object predicted by the moving object track in the preceding frame, update the moving object track in the preceding frame according to the detected position of the moving object, so as to form the updated moving object track in the current frame; and
- a second updating unit 402 configured to, when the position of the moving object detected in the current frame is not matched with the position of the moving object predicted by the moving object track in the preceding frame, establish a moving object track of the moving object detected in the current frame, and update the moving object track in the preceding frame according to the predicted position, to form the updated moving object track in the current frame.

In this embodiment, a first judging unit may further be provided, which is configured to judge whether the position of the moving object detected in the current frame is matched with the position of the moving object predicted by the moving object track in the preceding frame. For example, the first judging unit may be provided in the updating unit 202, and may also be directly provided in the establishing unit 101 or the counting unit 100, and a position of the first judging unit is not limited in this embodiment.

Figure 5:
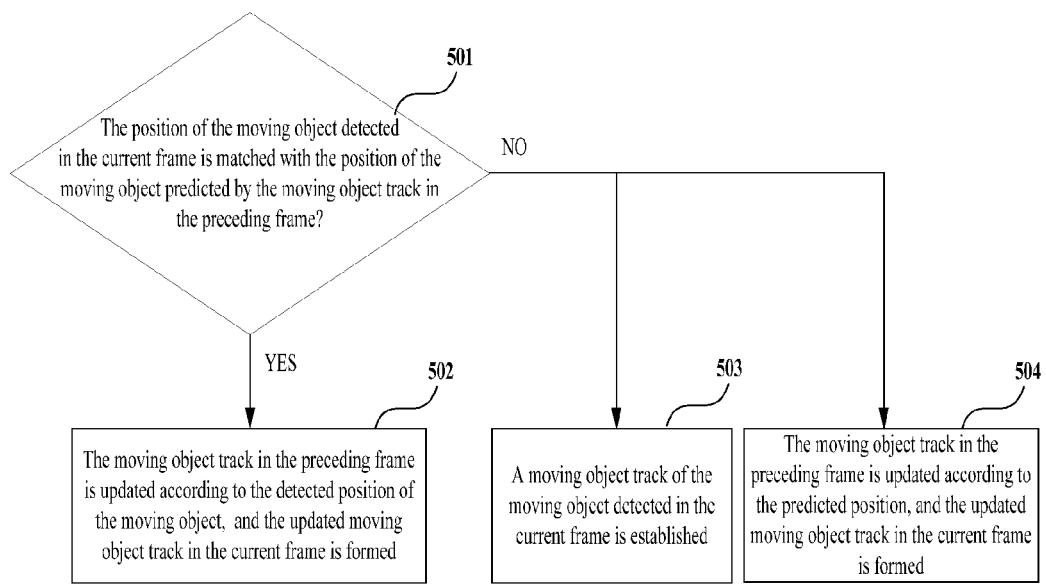
FIG. 5 is a flowchart of a method for updating a moving object track set of a current frame of Embodiment 1 of the present disclosure.

FIG. 5 is a flowchart of a method for updating the moving object track set of the current frame of Embodiment 1 of the present disclosure. As shown in FIG. 5, the method includes:

Step 501: it is judged whether the position of the moving object detected in the current frame is matched with the position of the moving object predicted by the moving object track in the preceding frame, entering into step 502 when it is judged "yes", and entering into steps 503 and 504 when it is judged "no";

Step 502: the moving object track in the preceding frame is updated according to the detected position of the moving object, and the updated moving object track in the current frame is formed;

Step 503: a moving object track of the moving object detected in the current frame is established: and Step 504: the moving object track in the preceding frame is updated according to the predicted position, and the updated moving object track in the current frame is formed.

In this embodiment, the position of the moving object predicted by the moving object track in the preceding frame may be obtained by using an existing method. For example, for the moving object track in the preceding frame, the predicted position may be determined in upper, lower, left and right directions and at a tilted angle of 45 degrees according to possible moving directions and moving speeds of the moving object.

For example, in a case where the position of the moving object detected in the current frame is matched with the position of the moving object predicted by the moving object track in the preceding frame, the moving object detected in the current frame may be combined into the moving object track in the preceding frame, to complete the update of the moving object track in the preceding frame, and form the updated moving object track in the current frame.

In this embodiment, in a case where the position of the moving object detected in the current frame is not matched with the position of the moving object predicted by the moving object track in the preceding frame, the second updating unit 402 establishes a moving object track of the moving object detected in the current frame, and updates the moving object track in the preceding frame according to the predicted position, to form the updated moving object track in the current frame.

For example, in a case where the position of the moving object detected in the current frame is not matched with the position of the moving object predicted by the moving object track in the preceding frame, a new moving object track may be established according to the detected position of the moving object, and the moving object tracks may be updated according to the predicted position of the moving object track in the preceding frame, to form the updated moving object tracks in the current frame.

In this embodiment, the updating unit 202 updates the moving object track set of the current frame via the first updating unit 401 and the second updating unit 402.

In this embodiment, after the updating unit 202 updates the moving object track set of the current frame, the scoring unit 203 determines the score of the moving object track in the current frame according to the number of times of consecutively detecting the moving object in the moving object track in the updated moving object track set in the current frame and before the current frame.

A structure of the scoring unit 203 and a method for determining the score of moving object track in the current frame shall be illustrated below.

Figure 6:
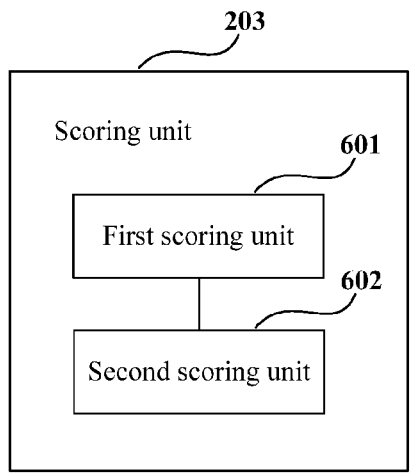
FIG. 6 is a schematic diagram of a structure of a scoring unit 203 of Embodiment 1 of the present disclosure.

FIG. 6 is a schematic diagram of a structure of the scoring unit 203 of Embodiment 1 of the present disclosure. As shown in FIG. 6, the scoring unit 203 includes:

- a first scoring unit 601 configured to, when a moving object track in the updated moving object track set in the current frame has consecutively detected a moving object in the current frame relative to the preceding frame, determine the score of the moving object track in the current frame as the score of the moving object track in the preceding frame plus the number of times of consecutively detecting the moving object in the current frame and before the current frame; and
- a second scoring unit 602 configured to, when a moving object track in the updated moving object track set in the current frame has not consecutively detected a moving object in the current frame relative to the preceding frame, determine the score of the moving object track in the current frame as the score of the moving object track in the preceding frame subtracted by 1.

In this embodiment, a second judging unit may further be provided, which is configured to judge whether the updated moving object track in moving object track set in the current frame has consecutively detected a moving object in the current frame and the preceding frame. For example, the second judging unit may be provided in the scoring unit 203, and may also be directly provided in the establishing unit 101 or the counting unit 100, and a position of the second judging unit is not limited in this embodiment.

Figure 7:
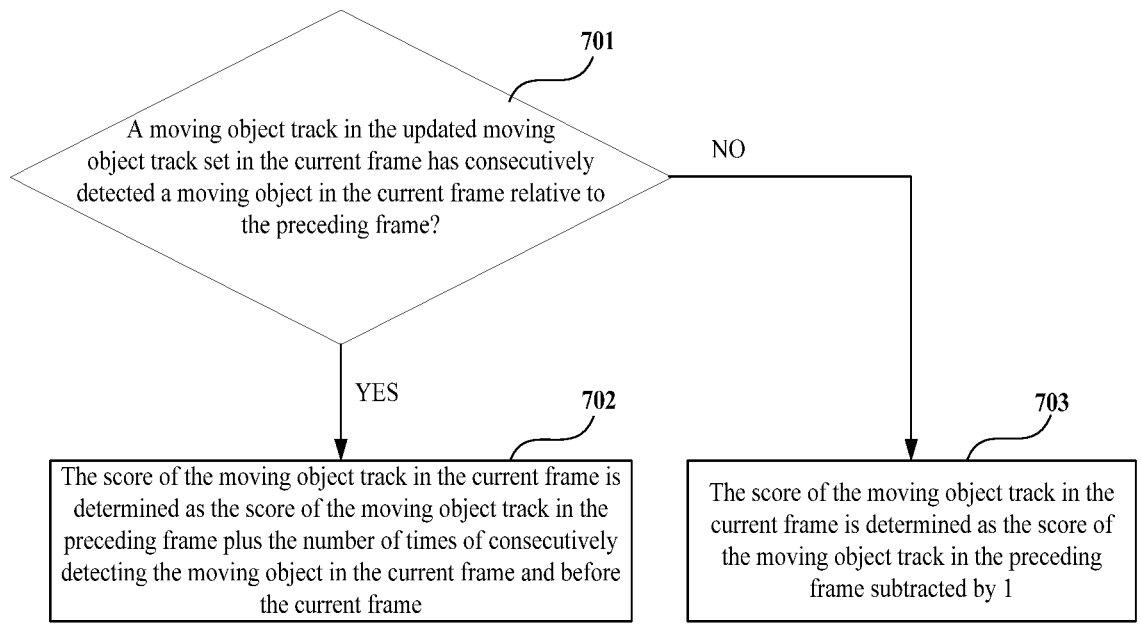
FIG. 7 is a flowchart of a method for determining a score of a track of a moving object of the current frame of Embodiment 1 of the present disclosure.

FIG. 7 is a flowchart of a method for determining the score of the track of the moving object of the current frame of Embodiment 1 of the present disclosure. As shown in FIG. 7, the method includes:

Step 701: it is judged whether a moving object track in the updated moving object track set in the current frame has consecutively detected a moving object in the current frame relative to the preceding frame, entering into step 702 when it is judged "yes", and entering into step 703 when it is judged "no";

Step 702: the score of the moving object track in the current frame is determined as the score of the moving object track in the preceding frame plus the number of times of consecutively detecting the moving object in the current frame and before the current frame; and Step 703: the score of the moving object track in the current frame is determined as the score of the moving object track in the preceding frame subtracted by 1.

In this embodiment, the consecutively detecting the moving object refers to detecting a moving object in the preceding frame and detecting the same moving object in the current frame; at this moment, for the current frame, the number of times of consecutively detecting the moving object is 1, and when the same moving object is detected in the next frame, for the next frame, the number of times of consecutively detecting the moving object is 2, and so on. When the moving object is not detected at a frame after it is consecutively detected for multiple times, the number of times of consecutively detecting the moving object shall be recalculated when the moving object is detected in a frame next to the frame.

The scoring method of Embodiment 1 of the present disclosure shall be described below by way of an example. For example, the surveillance video includes 7 frames of images, and when a moving object is detected in a first frame and a track 1 is established according to the moving object, a score of the track 1 in the first frame is 0, that is, a score of a newly established moving object track is set to be 0; when the moving object is detected consecutively in a second frame and the track 1 is updated according to the detected moving object, a score of the updated track 1 in the second frame is 0+1=1; when the moving object is detected consecutively in a third frame and the track 1 is updated according to the detected moving object, a score of the updated track 1 in the third frame is 1+2=3; when the moving object is detected consecutively in a fourth frame and the track 1 is updated according to the detected moving object, a score of the updated track 1 in the fourth frame is 3+3=6; when the moving object is not detected in a fifth frame and the track 1 is updated according to a predicted position of the track 1 in the fourth frame, a score of the updated track 1 in the fifth frame is 6−1=5; when the moving object is again detected in a sixth frame and the track 1 is updated according to the detected moving object, a score of the updated track 1 in the sixth frame is 5+0=5; and when the moving object is detected consecutively in a seventh frame and the track 1 is updated according to the detected moving object, a score of the updated track 1 in the seventh frame is 5+1=6. Hence, a final score of the track 1 is 6.

In this embodiment, after the establishing unit establishes the moving object track set and scores the moving object tracks, the filtering unit 102 is configured to remove a moving object track in the moving object track set with a score less than or equal to a predefined threshold value.

In this embodiment, the predefined threshold value may be set according to an actual situation. For example, the predefined threshold value may be set to be 0, and the filtering unit 102 removes a moving object track in the moving object track set with a score less than or equal to 0.

In this embodiment, the filtering unit 102 may further combine two moving object tracks with a distance less than a predefined threshold value in the moving object track set. For example, the predefined threshold value may be set according to an actual situation. In this way, accuracy of the counting may be improved further.

In this embodiment, the counting unit 103 counts moving objects according to moving object tracks in the moving object track set after the removal. In a case where the filtering unit 102 further combines two moving object tracks with a distance less than a predefined threshold value in the moving object track set, the counting unit 103 counts the moving objects according to moving object tracks in the moving object track set after the removal and combining.

In this embodiment, counting the moving objects according to moving object tracks may use an existing method. For example, an automatic identification counting or manual counting method may be used.

It can be seen from the above embodiment that moving object tracks in a moving object track set are scored according to the number of times of consecutively detecting a moving object, and the moving object tracks in the moving object track set are screened according to the scores of the moving object tracks, thereby ensuring over completeness of the established moving object track set, and efficiently improving accuracy of the counting.

Embodiment 2

Figure 8:
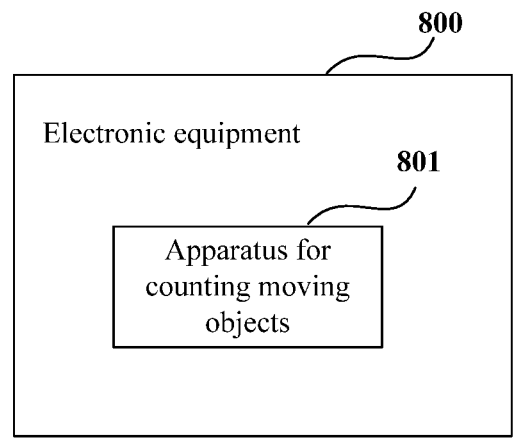
FIG. 8 is a schematic diagram of a structure of the electronic equipment of Embodiment 2 of the present disclosure.

An embodiment of the present disclosure provides electronic equipment. FIG. 8 is a schematic diagram of a structure of the electronic equipment of Embodiment 2 of the present disclosure. As shown in FIG. 8, the electronic equipment 800 includes an apparatus 801 for counting moving objects. In this embodiment, a structure and functions of the apparatus 801 for counting moving objects are identical to those described in Embodiment 1, and shall not be described herein any further.

Figure 9:
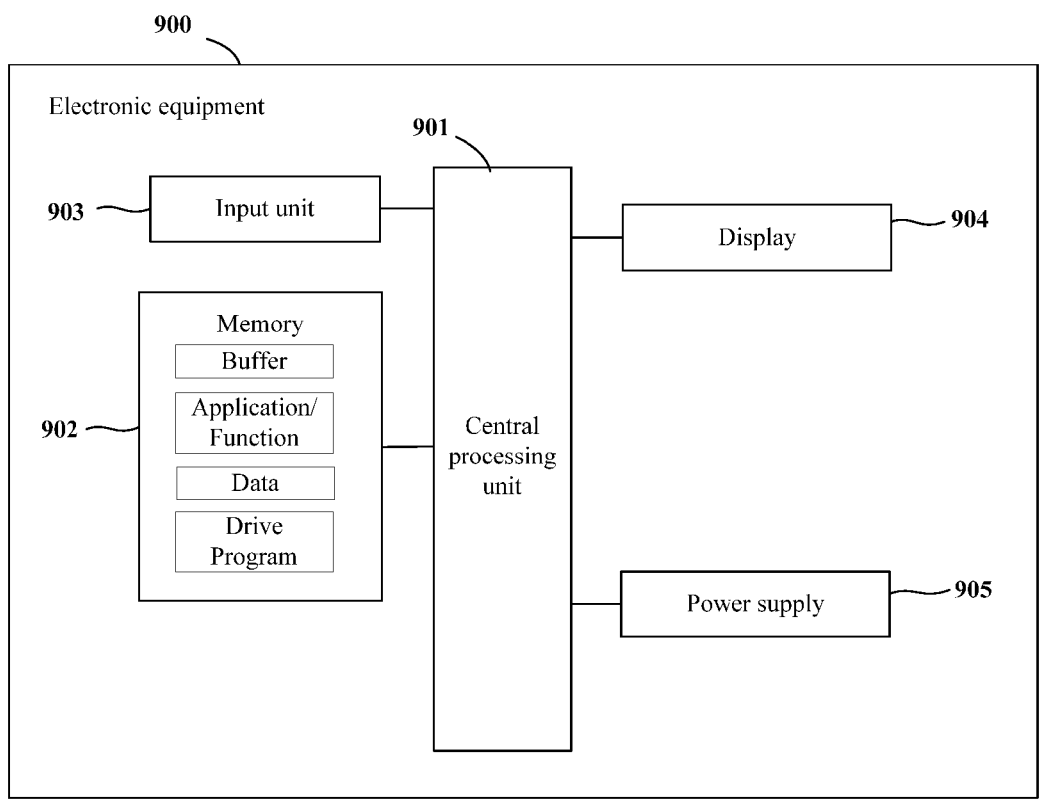
FIG. 9 is a block diagram of a systematic structure of the electronic equipment of Embodiment 2 of the present disclosure.

FIG. 9 is a block diagram of a systematic structure of the electronic equipment of Embodiment 2 of the present disclosure. As shown in FIG. 9, the electronic equipment 900 may be a computer system including a central processing unit 901 and a memory 902, the memory 902 being coupled to the central processing unit 901. This figure is illustrative only, and other types of structures may also be used, so as to supplement or replace this structure and achieve telecommunications function or other functions.

As shown in FIG. 9, the electronic equipment 900 may further include an input unit 903, a display 904, and a power supply 905.

In an implementation, the functions of the apparatus for counting moving objects described in Embodiment 1 may be integrated into the central processing unit 901. In this embodiment, the central processing unit 901 may be configured to: detect a moving object in each frame of image in a surveillance video, establish a moving object track set according to the detected moving object, and score a track of the moving object according to the number of times of consecutively detecting a moving object in the moving object track in the moving object track set; remove a moving object track in the moving object track set with a score less than or equal to a predefined threshold value; and count moving objects according to moving object tracks in the moving object track set after the removal.

In this embodiment, the detecting a moving object in each frame of image in a surveillance video, establishing a moving object track set according to the detected moving object, and scoring a track of the moving object according to the number of times of consecutively detecting a moving object in the moving object track in the moving object track set, include: detecting a moving object in a predefined area in a current frame; updating a moving object track in a preceding frame or establishing a moving object track according to a position of the moving object detected in the current frame and a position of moving object predicted by the moving object track in the preceding frame, to update a moving object track set in the current frame; and determining a score of a moving object track in the current frame according to the number of times of consecutively detecting a moving object in the moving object track in the updated moving object track set in the current frame and before the current frame.

In this embodiment, the updating a moving object track in a preceding frame or establishing a moving object track according to a position of the moving object detected in the current frame and a position of moving object predicted by the moving object track in the preceding frame, so as to update a moving object track set in the current frame, includes: when the position of the moving object detected in the current frame is matched with the position of the moving object predicted by the moving object track in the preceding frame, updating the moving object track in the preceding frame according to the detected position of the moving object, so as to form the updated moving object track in the current frame; and when the position of the moving object detected in the current frame is not matched with the position of the moving object predicted by the moving object track in the preceding frame, establishing a moving object track of the moving object detected in the current frame, and updating the moving object track in the preceding frame according to the predicted position, to form the updated moving object track in the current frame.

In this embodiment, the determining a score of a moving object track in the current frame according to the number of times of consecutively detecting a moving object in the moving object track in the updated moving object track set in the current frame and before the current frame, includes: when a moving object track in the updated moving object track set in the current frame has consecutively detected a moving object in the current frame relative to the preceding frame, determining the score of the moving object track in the current frame as the score of the moving object track in the preceding frame plus the number of times of consecutively detecting the moving object in the current frame and before the current frame; and when a moving object track in the updated moving object track set in the current frame has not consecutively detected a moving object in the current frame relative to the preceding frame, determining the score of the moving object track in the current frame as the score of the moving object track in the preceding frame subtracted by 1.

In this embodiment, the central processing unit 901 may further be configured to: combine two moving object tracks with a distance less than a predefined threshold value in the moving object track set; and the counting moving objects according to moving object tracks in the moving object track set after the removal includes: counting moving objects according to moving object tracks in the moving object track set after the removal and combining.

In another implementation, the apparatus for counting moving objects described in Embodiment 1 and the central processing unit 901 may be configured separately. For example, the apparatus for counting moving objects may be configured as a chip connected to the central processing unit 901, with its functions being realized under control of the central processing unit 901.

In this embodiment, the electronic equipment 900 does not necessarily include all the parts shown in FIG. 9.

As shown in FIG. 9, the central processing unit 901 is sometimes referred to as a controller or control, and may include a microprocessor or other processor devices and/or logic devices. The central processing unit 901 receives input and controls operations of every components of the electronic equipment 900.

The memory 902 may be, for example, one or more of a buffer memory, a flash memory, a hard drive, a mobile medium, a volatile memory, a nonvolatile memory, or other suitable devices. And the central processing unit 901 may execute the programs stored in the memory 902, so as to realize information storage or processing, etc. Functions of other parts are similar to those of the related art, which shall not be described herein any further. The parts of the electronic equipment 900 may be realized by specific hardware, firmware, software, or any combination thereof, without departing from the scope of the present disclosure.

It can be seen from the above embodiment that moving object tracks in a moving object track set are scored according to the number of times of consecutively detecting a moving object, and the moving object tracks in the moving object track set are screened according to the scores of the moving object tracks, thereby ensuring over completeness of the established moving object track set, and efficiently improving accuracy of the counting.

Embodiment 3

Figure 10:
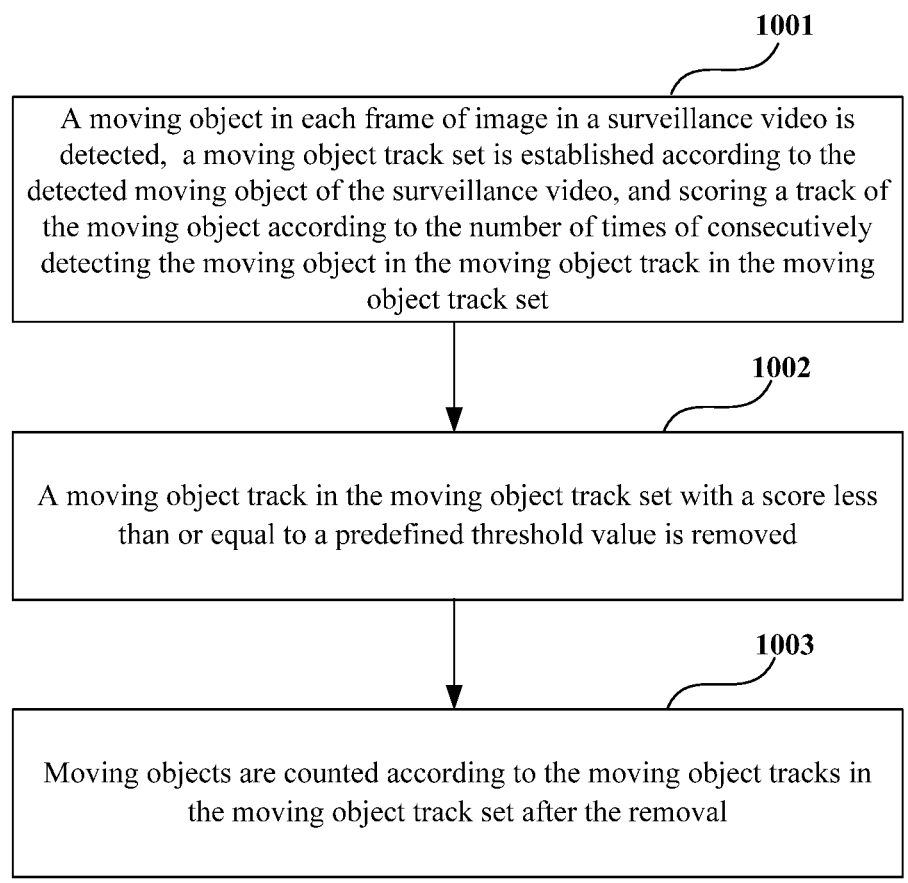
FIG. 10 is a flowchart of the method for counting moving objects of Embodiment 3 of the present disclosure.

An embodiment of the present disclosure provides a method for counting moving objects, corresponding to the apparatus for counting moving objects described in Embodiment 1. FIG. 10 is a flowchart of the method for counting moving objects of Embodiment 3 of the present disclosure. As shown in FIG. 10, the method includes:

Step 1001: a moving object in each frame of image in a surveillance video is detected, a moving object track set is established according to the detected moving object of the surveillance video, and scoring a track of the moving object according to the number of times of consecutively detecting the moving object in the moving object track in the moving object track set;

Step 1002: a moving object track in the moving object track set with a score less than or equal to a predefined threshold value is removed; and Step 1003: moving objects are counted according to the moving object tracks in the moving object track set after the removal.

In this embodiment, a method for detecting a moving object, a method for establishing a moving object track set, a method for scoring tracks of the moving objects in the moving object track set and a method for removing a part of moving object track sets are identical to those described in Embodiment 1, and shall not be described herein any further.

It can be seen from the above embodiment that moving object tracks in a moving object track set are scored according to the number of times of consecutively detecting a moving object, and the moving object tracks in the moving object track set are screened according to the scores of the moving object tracks, thereby ensuring over completeness of the established moving object track set, and efficiently improving accuracy of the counting.

An embodiment of the present disclosure provides a computer-readable program, when the program is executed in an apparatus for counting moving objects or electronic equipment, the program enables a computer to carry out the method for counting moving objects as described in Embodiment 3 in the apparatus for counting moving objects or the electronic equipment.

An embodiment of the present disclosure further provides a storage medium in which a computer-readable program is stored, the computer-readable program enables a computer to carry out the method for counting moving objects as described in Embodiment 3 in an apparatus for counting moving objects or electronic equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory computer readable storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for counting moving objects, comprising:
an establishing unit configured to detect a moving object in each frame of an image in a surveillance video, establish a moving object track set according to a detected moving object, and score a moving object track of the moving object according to a number of times of consecutively detecting the moving object in the moving object track in the moving object track set;
a filtering unit configured to remove the moving object track in the moving object track set with a score less than or equal to a predefined threshold value; and
a counting unit configured to count moving objects according to moving object tracks in the moving object track set after removal.

2. The apparatus according to claim 1, wherein the establishing unit comprises:

a detecting unit configured to detect the moving object in a predefined area in a current frame;
an updating unit configured to update the moving object track in a preceding frame or establish the moving object track according to a position of the moving object detected in the current frame and the position of the moving object predicted by the moving object track in the preceding frame, to update the moving object track set in the current frame; and
a scoring unit configured to determine the score of the moving object track in the current frame according to the number of times of consecutively detecting the moving object in the moving object track in an updated moving object track set in the current frame and before the current frame.

3. The apparatus according to claim 2, wherein the updating unit comprises:
a first updating unit configured to, when the position of the moving object detected in the current frame is matched with the position of the moving object predicted by the moving object track in the preceding frame, update the moving object track in the preceding frame according to a detected position of the moving object, to form the updated moving object track in the current frame; and
a second updating unit configured to, when the position of the moving object detected in the current frame is not matched with the position of the moving object predicted by the moving object track in the preceding frame, establish the moving object track of the moving object detected in the current frame, and update the moving object track in the preceding frame according to a predicted position, to form the updated moving object track in the current frame.

4. The apparatus according to claim 2, wherein the scoring unit comprises:
a first scoring unit configured to, when the moving object track in an updated moving object track set in the current frame has consecutively detected the moving object in the current frame relative to the preceding frame, determine the score of the moving object track in the current frame as the score of the moving object track in the preceding frame plus the number of times of consecutively detecting the moving object in the current frame and before the current frame; and
a second scoring unit configured to, when a moving object track in the updated moving object track set in the current frame has not consecutively detected the moving object in the current frame relative to the preceding frame, determine the score of the moving object track in the current frame as the score of the moving object track in the preceding frame subtracted by 1.

5. The apparatus according to claim 1, wherein,
the filtering unit is further configured to combine two moving object tracks with a distance less than a predefined distance threshold value in the moving object track set; and
the counting unit is configured to count moving objects according to moving object tracks in the moving object track set after removal and combining.

6. A method for counting moving objects, comprising:
detecting a moving object in each frame of an image in a surveillance video, establishing a moving object track set according to a detected moving object of the surveillance video, and scoring a moving object track of the moving object according to a number of times of consecutively detecting a moving object in the moving object track in the moving object track set;

removing a moving object track in the moving object track set with a score less than or equal to a predefined threshold value; and counting moving objects according to the moving object tracks in the moving object track set after removal.

7. The method according to claim 6, wherein the detecting moving object in each frame of the image in the surveillance video, establishing the moving object track set according to the detected moving object of the surveillance video, and scoring the track of the moving object according to the number of times of consecutively detecting the moving object in the moving object track in the moving object track set, comprises:

detecting the moving object in a predefined area in a current frame;

updating the moving object track in a preceding frame or establishing the moving object track according to a position of the moving object detected in the current frame and the position of moving object predicted by the moving object track in the preceding frame, to update the moving object track set in the current frame; and determining a score of the moving object track in the current frame according to the number of times of consecutively detecting the moving object in the moving object track in an updated moving object track set in the current frame and before the current frame.

8. The method according to claim 7, wherein the updating the moving object track in the preceding frame or establishing the moving object track according to the position of the moving object detected in the current frame and the position of moving object predicted by the moving object track in a preceding frame, to update the moving object track set in the current frame, comprises:

when the position of the moving object detected in the current frame is matched with the position of the moving object predicted by the moving object track in the preceding frame, updating the moving object track in the preceding frame according to a detected position of the moving object, to form the updated moving object track in the current frame; and when the position of the moving object detected in the current frame is not matched with the position of the moving object predicted by the moving object track in the preceding frame, establishing the moving object track of the moving object detected in the current frame, and updating the moving object track in the preceding frame according to a predicted position, to form the updated moving object track in the current frame.

9. The method according to claim 7, wherein the determining the score of the moving object track in the current frame according to the number of times of consecutively detecting the moving object in the moving object track in the updated moving object track set in the current frame and before the current frame, comprises:

when the moving object track in the updated moving object track set in the current frame has consecutively detected the moving object in the current frame relative to the preceding frame, determining the score of the moving object track in the current frame as the score of the moving object track in the preceding frame plus the number of times of consecutively detecting the moving object in the current frame and before the current frame; and when the moving object track in the updated moving object track set in the current frame has not consecutively detected the moving object in the current frame relative to the preceding frame, determining the score of the moving object track in the current frame as the score of the moving object track in the preceding frame subtracted by 1.

10. The method according to claim 6, wherein the method further comprises:

combining two moving object tracks with a distance less than a predefined distance threshold value in the moving object track set; and the counting moving objects according to the moving object tracks in the moving object track set after the removal comprises:

counting moving objects according to the moving object tracks in the moving object track set after removal and combining.

11. An apparatus for counting moving objects, comprising:

a computer system, comprising an establishing unit configured to detect a moving object in each frame of an image in a surveillance video, establish a moving object track set according to a detected moving object, and score a moving object track of the moving object according to a number of times of consecutively detecting the moving object in the moving object track in the moving object track set;

a filtering unit configured to remove the moving object track in the moving object track set with a score less than or equal to a predefined threshold value; and a counting unit configured to count moving objects according to moving object tracks in the moving object track set after removal.

12. A non-transitory computer readable storage medium storing a method for counting moving objects, the method comprising:

detecting a moving object in each frame of an image in a surveillance video, establishing a moving object track set according to a detected moving object of the surveillance video, and scoring a moving object track of the moving object according to a number of times of consecutively detecting a moving object in the moving object track in the moving object track set;

removing a moving object track in a moving object track set with a score less than or equal to a predefined threshold value; and counting moving objects according to the moving object tracks in the moving object track set after removal.

* * * * *